United States Patent
Zhou (10) Patent No.: US 10,416,525 B2
(45) Date of Patent: Sep. 17, 2019

(54) METHOD AND APPARATUS FOR PHASE-MATCHED OPTICAL AND RF WAVE PROPAGATIONS FOR SEMICONDUCTOR-BASED MZM MODULATORS

(71) Applicant: NeoPhotonics Corporation, San Jose, CA (US)

(72) Inventor: Jianying Zhou, Acton, MA (US)

(73) Assignee: NeoPhotonics Corporation, San Jose, CA (US)

( * ) Notice: Subject to any disclaimer, the term of this patent is extended or adjusted under 35 U.S.C. 154(b) by 0 days.

(21) Appl. No.: 15/873,363

(22) Filed: Jan. 17, 2018

(65) Prior Publication Data

US 2018/0203322 A1    Jul. 19, 2018

Related U.S. Application Data

(60) Provisional application No. 62/447,521, filed on Jan. 18, 2017.

(51) Int. Cl.
*G02F 1/225* (2006.01)
*G02F 1/01* (2006.01)
*G02F 1/21* (2006.01)

(52) U.S. Cl.
CPC ............ *G02F 1/225* (2013.01); *G02F 1/0121* (2013.01); *G02F 1/2255* (2013.01); *G02F 2001/212* (2013.01)

(58) Field of Classification Search
None
See application file for complete search history.

(56) References Cited

U.S. PATENT DOCUMENTS

| | | |
|---|---|---|
| 7,317,846 B2 | 1/2008 | Keil |
| 8,320,720 B2 | 11/2012 | Webster et al. |
| 8,363,986 B2 | 1/2013 | Webster et al. |
| 9,523,870 B2 | 12/2016 | Wei et al. |
| 9,541,775 B2 | 1/2017 | Ayazi et al. |
| 9,766,484 B2 | 9/2017 | Adams et al. |
| 2002/0159666 A1 | 10/2002 | Gates, II et al. |

(Continued)

FOREIGN PATENT DOCUMENTS

EP    0609887 B1    5/1998

OTHER PUBLICATIONS

International Search Report and Written Opinion for co-pending international application No. PCT/US2018/014016 dated Apr. 30, 2018 (16 pages).

(Continued)

*Primary Examiner* — Tina M Wong
(74) *Attorney, Agent, or Firm* — Christensen, Fonder, Dardi & Herbert PLLC; Peter S. Dardi (57) ABSTRACT

Optical modulators with semiconductor based optical waveguides interacting with an RF waveguide in a traveling wave structure. The semiconductor optical waveguide generally comprise a p-n junction along the waveguide. To reduce the phase walk-off between the optical signal and the RF signal, the traveling wave structure can comprise one or more compensation sections where the phase walk-off is reversed. The compensation sections can comprise a change in dopant concentrations, extra length for the optical waveguide and/or extra length for the RF waveguide. Corresponding methods are described.

17 Claims, 7 Drawing Sheets

(56) References Cited

U.S. PATENT DOCUMENTS

| | | | |
|---|---|---|---|
| 2004/0052442 A1* | 3/2004 | Li | B82Y 20/00 |
| | | | 385/3 |
| 2007/0237444 A1 | 10/2007 | Keil | |
| 2008/0212913 A1* | 9/2008 | Gill | G02F 1/025 |
| | | | 385/2 |
| 2012/0195547 A1 | 8/2012 | Rasras | |
| 2013/0148920 A1 | 6/2013 | Kissa | |
| 2014/0023309 A1 | 1/2014 | Jiang | |
| 2017/0052424 A1 | 2/2017 | Itwasuka et al. | |
| 2017/0134096 A1 | 5/2017 | Zheng et al. | |
| 2017/0285437 A1 | 10/2017 | Doerr et al. | |
| 2017/0346570 A1 | 11/2017 | Teranishi | |
| 2018/0252982 A1 | 9/2018 | Chen et al. | |
| 2018/0299617 A1 | 10/2018 | Ticknor et al. | |

OTHER PUBLICATIONS

Chen et al, "25Gb/s Hybrid Silicon Switch Using a Capacitively Loaded Traveling Wave Electrode," Optics Express vol. 18(2), Jan. 2010, pp. 1070-1075.

\* cited by examiner

METHOD AND APPARATUS FOR PHASE-MATCHED OPTICAL AND RF WAVE PROPAGATIONS FOR SEMICONDUCTOR-BASED MZM MODULATORS

CROSS REFERENCE TO RELATED APPLICATIONS

This application claims priority to copending U.S. provisional patent application 62/447,521 to Zhou et al. filed on Jan. 18, 2017, entitled "Method and Apparatus for Phase-Matched Optical and RF Wave Propagations for High Speed High Efficiency Linear MZM Modulators," incorporated herein by reference.

FIELD OF THE INVENTION

The invention relates to optical modulators comprising a semiconductor optical waveguide interfaced with RF waveguides in which electro-optical coupling provides a modulation to the optical signal. The invention further relates to waveguide designs to decrease phase shifts between propagating electrical signals and optical intensity propagating through the respective waveguides.

BACKGROUND OF THE INVENTION

A traveling wave structure is widely used in high speed linear modulators with Mach-Zehnder modulator (MZM) structures with traditional material platforms such as LiNbO3 and InP. Silicon-on-insulator (SOI) platform, which can be used to make optical waveguide, has appeared as the emerging technology for optoelectronics devices including MZM modulators since SOI fabrication infrastructure is compatible with CMOS technology and is suitable for photonic integration; however, the most promising technology for SOI based optical modulation, which uses carrier depletion through doped P-N junction, suffers high optical loss and high Vpi, where Vpi is defined as the voltage required to generate Pi phase shift on MZM arms. High Vpi requires high driver voltage and thus high power consumption for modulator drivers, which limit to their applications where low power consumptions are required. In additional, high speed modulators are required to meet the ever-increasing bandwidth requirements for today's communication and data center interconnect applications.

An MZM modulator is formed by splitting input optical waveguide into two optical waveguide arms that operate as phase shifters due to electro-optic coupling, which are then combined to form a combined interference signal based on the Mach-Zehnder interferometer structure. By modulating phases on phase shifters, the optical phase and amplitude modulations can be achieved. The most promising method for silicon base optical modulators is to use carrier depletion which consists of a P-N junction inside an optical waveguide. Under the reverse bias condition, the P-N junction depletes carrier and causes a change in refractive index and the phase change as light propagates through the waveguide with the refractive index change. In traveling wave structure based modulators, a phase shifter has overlapped RF and optical waveguides, which can realize electrical-to-optical (E-O) conversion, characterized as phase change (degree) on optical wave propagated along the phase shifter per unit voltage applied to phase shifter. This structure is attractive for high speed linear modulators.

SUMMARY OF THE INVENTION

In a first aspect, the invention pertains to an optical modulator comprising a semiconductor-based optical waveguide and a pair of RF waveguides, wherein the optical waveguide and the RF waveguide are configured with coupling regions to provide an RF electromagnetic field within the optical waveguide and with one or more compensation sections with lengths of either optical waveguide or RF waveguide that have substantially reduced or eliminated electro-optical coupling. Generally, the RF waveguides form a continuous waveguide structure through the one or more compensation sections.

In a further aspect, the invention pertains to an optical modulator comprising a semiconductor-based optical waveguide and a RF waveguide configured to form an coupling region over which electro-optical coupling occurs to modulate an optical signal within the semiconductor-based optical waveguide, wherein the semiconductor-based optical waveguide comprises a p-n junction formed according to corresponding doping of the semiconductor along a cross section through the optical waveguide perpendicular to a light propagation direction, in which the doping varies at one or more compensation sections along the semiconductor-based optical waveguide to reduce accumulated phase difference between an optical transmission in the semiconductor-based optical waveguide and an RF signal in the RF waveguide.

In another aspect, the invention pertains to a method for modulating an optical signal comprising the steps of propagating optical laser light down a semiconductor optical waveguide, and propagating RF signal along a pair of RF waveguides. Generally, the semiconductor optical waveguide and the RF waveguide are configured in a traveling wave modulator structure to provide electro-optical coupling, and the traveling wave modulator structure comprise one or more compensation sections at which the relative phase of the propagating optical light and the propagating RF signal are corrected for a propagating speed differential in which the optical signal is modulated by a single RF signal.

DETAILED DESCRIPTION OF THE INVENTION

RF driven optical modulator structures are described that can compensate for phase misalignment between an RF signal and an optical signal within a traveling wave electro-optical coupling structure with a Mach-Zehnder modulator (MZM) design. The modifications to provide phase compensation are particularly applicable to semiconductor based optical waveguides, especially silicon-based optical waveguides. As used herein, silicon-based refers to elemental silicon materials that can be doped and does not refer to silicon dioxide based glass waveguides. To adjust the relative phases of the optical propagation and RF propagation through the coupled waveguides of the traveling wave structure, in some embodiments, either the optical waveguide or the RF waveguide in a compensation section can be looped out of a coupling configuration to phase shift the propagations relative to each other for better phase alignment upon rejoining of the two signals. In additional or alternative embodiments, the dopant levels of the optical waveguide can be altered in a compensation section to change the relative propagation speeds of the RF signal and optical signal through the respective two waveguides to correct for phase shifting of the signals. The resulting modulator can be suitable for high speed MZM modulators.

In silicon-based optical modulators (e.g., silicon-on-insulator (SOI)) or other semiconductor based optical modulators, the optical waveguide is designed with a p-n junction at a phase shifter, i.e., electro-optical coupled sections of the modulator, with various doping for carrier depletions, while the RF waveguide is overlapped with optical waveguide in phase shifter with various RF coplanar waveguide (CPW) configurations such as SG, SS, GSG, GSSG, etc., where S refers to RF signals with voltages relative to ground and G refers to ground, to achieve electro-optical modulations. Optical waveguide loss can be reduced by refining the fabrication process with optical-property optimizations such as improving roughness of side wall in optical waveguides and low doping. Low loss optical waveguides can enable long travel optical waveguide for modulators, which has potential to achieve high overall electro-optical (E-O) conversion efficiency and thus low Vpi which is determined by the E-O conversion efficiency (per unit length) and overlapped length of RF and optical waveguides. However, long overlapped RF and optical waveguides generally have a phase mismatch between RF and optical waves propagated along waveguides, especially at high frequency, which can reduce the overall E-O conversion efficiency and E-O response bandwidth.

To achieve improved phase-matched RF and optical wave propagation, one possible method is to introduce a physical distributed capacitance as implemented in conventional InP travel waveguide modulators as shown in a hybrid format in Chen et al., "25 Gb/s hybrid silicon switch using a capacitively loaded traveling wave electrode," Optics Express Vol. 18(2), January 2010, pp 1070-1075, incorporated herein by reference. However, SOI waveguide has small physical sizes typical less than 1 micron, with typical waveguide height 0.2-0.3 microns and width 0.4-0.5 microns, and an RF waveguide needs an accurate design to achieve the desired overlap between RF field mode and doping (p-doping) area in optical waveguide for high efficiency E-O conversion. Thus, it is generally impractical to implement extra physical structures such as distributed capacitance to adjust RF waveguide or optical waveguide velocity. Another method to improve phase matching is to change the doping since the doping has major impact on the RF velocity through the change in equivalent capacitor in P-N junction. However, doping concentration, such as low doping, may be selected for performance improvement, such as low optical loss.

To achieve high E-O conversion efficiency (per unit length) in carrier depletion SOI modulator, high doping P-N junction has been widely used; however, high doping will also suffer high optical loss (per unit length). Thus, a relative short length of optical/RF waveguide is considered to compromise optical loss and E-O conversion or Vpi.

To reduce driver swing voltage requirement in SOI base MZM modulator, a common method is to use distributed RF/optical waveguides with a distributed drivers as shown in U.S. Pat. No. 7,317,846 to Keil (hereinafter the '846 patent), entitled "Propagation Delay Variation for a Distributed Optical Modulator Driver," incorporated herein by reference. This method for reducing driver swing voltage requirements generally suffers with respect to accurate control on the phase delay between distributed drivers. Therefore, this method is not considered suitable to high performance applications such as pulse amplitude modulation (PAM) and M-ary quadrature amplitude modulation (M-QAM) modulator, where linear and phase control is precisely required. A driver for PAM modulation is described generally in published U.S. patent application 2017/0346570 to Teranishi, entitled "Method of Controlling Optical Transmitter Operable for Pulse-Amplitude Modulation Signal," incorporated herein by reference. A driver for QAM modulation is described in published U.S. patent application 2017/0134096 to Zheng et al., entitled "Optical N-Level Quadrature Amplitude Modulation (NQAM) Generation Based on Phase Modulator," incorporated herein by reference. A similar structure as in the '846 patent is also described in published U.S. patent application 2017/0285437 to Doerr et al., entitled "Silicon Modulators and Related Apparatus and Methods," incorporated herein by reference.

Figure 1:
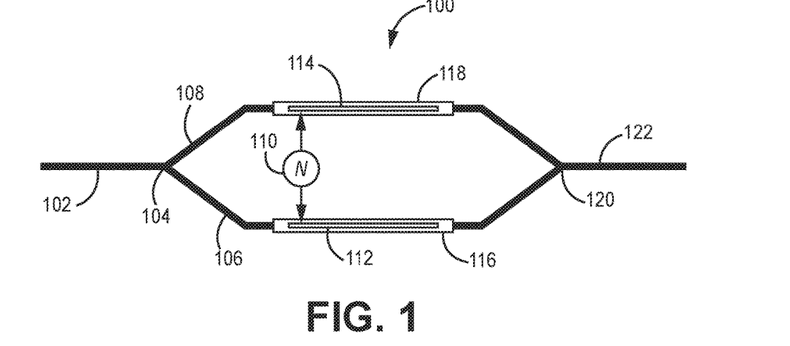
FIG. 1 is a schematic top view of a Mach-Zehnder modulator with a traveling wave structure having RF waveguides interfacing with the respective arms of a Mach-Zehnder interferometer.

Herein, innovative structures are proposed to address the problems outlined above to achieve high speed and high efficiency linear MZM modulator. A basic MZM structure is shown in FIG. 1. Mach-Zehnder modulator element 100 comprises an input optical waveguide 102 that is connected to optical splitter 104 that connects to first optical waveguide arm 106 and second optical waveguide arm 108. Each optical waveguide arm is coupled to one or more RF waveguides, respectively, 112, 114. RF waveguides 112, 114 are connected to an RF generator 110. The interface between optical waveguide arms 106, 108 and RF waveguides 112, 114 form respective coupling regions 116, 118. Optical waveguide arms 106, 108 join at optical coupler 120, which is then connected to output waveguide 122. The structures described herein to provide for improved optical phase and RF phase matching (compensation sections) have intermittent regions of phase matching that may not have high or any electro-optical coupling, but the phase matching nevertheless is designed to improve the overall electro-optical coupling due to the improved phase matching.

Figure 2:
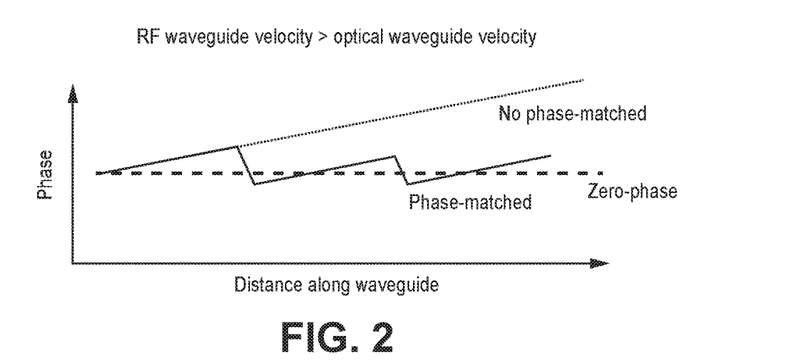
FIG. 2 is a plot of relative phase of a propagating signal in a RF waveguide and an optical signal in an optical waveguide in which without phase correction the RF waveguide velocity is greater than the optical waveguide velocity with one curve showing the phase mismatch without phase correction and a second curve showing the effects of phase correction as described herein.

Referring to FIG. 2, a schematic plot is shown of the phase mismatch between the optical waveguide and the RF waveguide as a function of distance along the waveguide for an embodiment with an RF waveguide velocity greater than optical waveguide velocity. With no phase correction, the phase difference grows with distance along the waveguide, which is contrasted with the phase difference with intermittent correction that keeps the phase difference nearer to the zero-phase difference line and within selected boundaries. Phase differences, or 'walkoff', of greater than about ±30° will start to noticeably reduce the modulation efficiency, effectively leading to an increase in Vpi. Phase walkoff greater than ±90° will actually reverse the modulation efficiency and cannot be overcome even with substantial increase of Vpi. Depending on, and in consideration of, the collateral 'costs' of the intermittent corrections, one would typically attempt to keep the walkoff from exceeding about ±60°, such that modulation-efficiency drops would not drop below about 50%.

Figure 3:
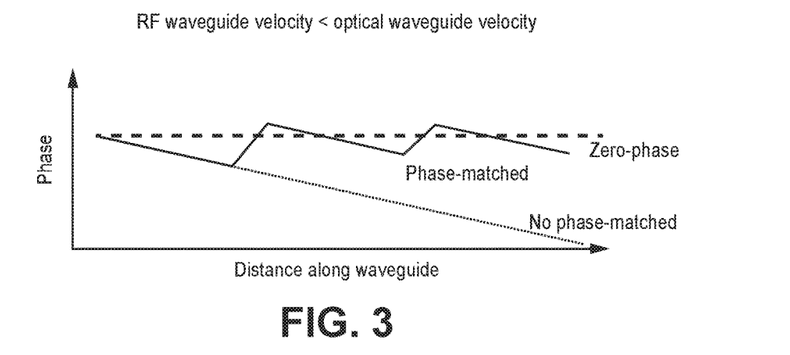
FIG. 3 is a plot of relative phase of a propagating signal in a RF waveguide and an optical signal in an optical waveguide in which without phase correction the RF waveguide velocity is less than the optical waveguide velocity with one curve showing the phase mismatch without phase correction and a second curve showing the effects of phase correction as described herein.

Referring to FIG. 3, a schematic plot is shown of the phase mismatch between the optical waveguide and the RF waveguide as a function of distance along the waveguide for an embodiment with an optical waveguide velocity greater than RF waveguide velocity. Again, with no phase correction, the phase difference magnitude grows in a negative direction relative to a zero phase shift with distance along the waveguide, which is contrasted with the phase difference with intermittent correction that keeps the phase difference nearer to the zero-phase difference line and within selected boundaries. The phase correction shown in FIG. 3 is in the opposite direction from the phase correction shown in FIG. 2.

Figure 4:
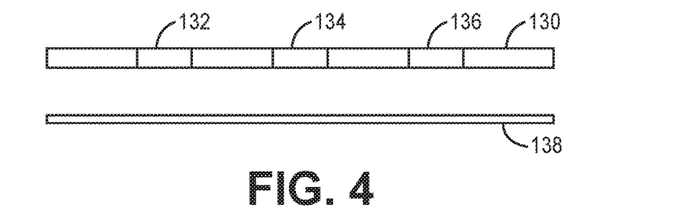
FIG. 4 is a top view of an optical waveguide with three compensation sections having altered semiconductor dopant levels to compensate for the RF and optical relative phase shift to reduce the phase shift value, in which the RF waveguide is separated to allow separate viewing of the optical waveguide.
Figure 5:
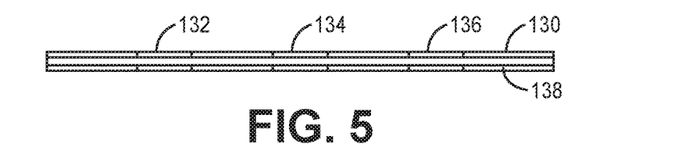
FIG. 5 is the assembled view of the structure of FIG. 4 in which the RF waveguide is mounted on top of the optical waveguide.

As described herein, phase correcting structures and corresponding methods are designed to achieve better phase-matched RF propagation and optical wave propagation, where the phase is intermittently re-aligned through the (phase) compensation sections in segmented structures. A first approach involves addition of compensation sections with altered doping including lower doping (up to no doping) or higher doping, dependent on the phase sign (delay or advance) between RF and optical propagation waves. This embodiment of the coupled waveguides is shown schematically in FIGS. 4 (separated view) and 5 (top view). Referring to FIGS. 4 and 5, optical waveguide 130 comprises compensation sections 132, 134, 136 in which the dopant levels are significantly altered from the remaining sections of waveguide. RF waveguide 138 interfaces with optical waveguide 130 to provide electro-optical coupling. The embodiments of the optical waveguides with lower doping concentration or no doping in compensation sections can reduce the equivalent capacitance in p-n junction which increases RF wave velocity, while the higher doping can increase equivalent capacitance in p-n junction which slows down RF wave velocity. As the doping has much less impact on optical wave velocity, by proper design in length and doping in the compensation sections, we can achieve the improved phase-matched RF and optical wave propagations.

While FIGS. 4 and 5 depict three compensation sections, the waveguides can alternatively have 1, 2, 4, 5, 6, 7, 8, 9, 10, or more than 10 compensation sections, which can be selected to achieve desired phase matchings balanced against processing convenience. As described further below, a cross section of the semiconductor waveguides can be patterned with various doped sections and a p-n junction generally located along the waveguide portion of the semiconductor. For silicon-based waveguides, the RF electrodes can be attached to highly doped portions of the structure adjacent to the doped regions connecting to the p-n junction of the waveguide, with some representative specific structures presented below. The compensation sections generally involve modification of dopant levels in the semiconductor sections contacting the RF waveguides, although the dopant level modifications can extend to other sections of the semiconductor structure. The silicon semiconductor contacting the RF electrode away from the compensation sections can have a dopant concentration generally of at least about $1 \times 10^{18}/cm^3$ and in some embodiments at least about $1 \times 10^{19}/cm^3$, up to potentially very high dopant levels. Suitable dopants for silicon, i.e., elemental silicon (Si), are well known in the art, such as phosphorous (n-dopant) and boron (p-dopant). As noted above, at compensation sections, a reduced dopant concentration can be essentially zero, i.e., background contaminant levels, or at some intermediate value between zero and the selected dopant concentrations away from the compensation sections, and an increased dopant concentration can be at least about 5% greater, in other embodiments at least about 10% greater, and in further embodiments at least about 30% greater dopant concentration than at corresponding portions of the waveguide away from the compensation sections. A person of ordinary skill in the art will recognize that additional ranges of numbers of compensation sections and dopant concentrations within the explicit ranges above are contemplated and are within the present disclosure.

Figure 6:
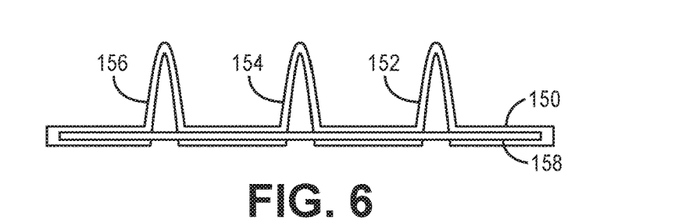
FIG. 6 is a top schematic view of a semiconductor optical waveguide coupled to an RF waveguide in which compensation sections have extended portions of optical waveguides extending away from the RF waveguides.
Figure 7:
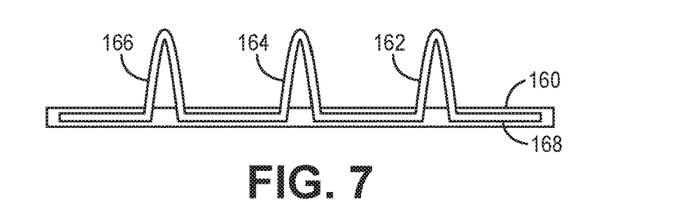
FIG. 7 is a top schematic view of a semiconductor optical waveguide coupled to an RF waveguide in which compensation sections have extended portions of RF waveguides extending away from the optical waveguides.

A second approach to providing phase correction involves adding extra optical waveguide length or adding extra RF waveguide length, dependent on the phase sign (i.e., phase delay or advance) between RF and optical propagation waves. An embodiment of the coupled waveguides with compensation sections having extra optical waveguide length is shown schematically in FIG. 6. Optical waveguide 150 has compensation sections 152, 154, 156 each having an extra length of optical waveguide. RF waveguide 158 couples to optical waveguide 150 away from compensation sections 152, 154, 156, where the electro-optical coupling is significantly reduced or eliminated. An embodiment of the coupled waveguides with compensation sections having extra RF waveguide length is shown schematically in FIG. 7. Referring to FIG. 7, RF waveguide 160 has compensation sections 162, 164, 166 each having an extra length of RF waveguide, and optical waveguide 168 couples to RF waveguide 160 primarily or exclusively away from compensation sections 162, 164, 166. FIGS. 6 and 7 depict structures with three compensation sections each with extended waveguides, and in other embodiments the structures can have 1, 2, 4, 5, 6, 7, 8, 9, 10, or more than 10 compensation sections each with extended portions of either optical waveguide or RF waveguide that extends away from electro-optically coupled portions of the structure. Each extended waveguide portion generally has a length that is at least about 1%, in further embodiments at least about 5%, and in other embodiments at least about 15% of the total waveguide length along the modulation section. A person or ordinary skill in the art will recognize that additional ranges of numbers of compensation sections and length of waveguides in compensation sections within the explicit ranges above are contemplated and are within the present disclosure.

Figure 8:
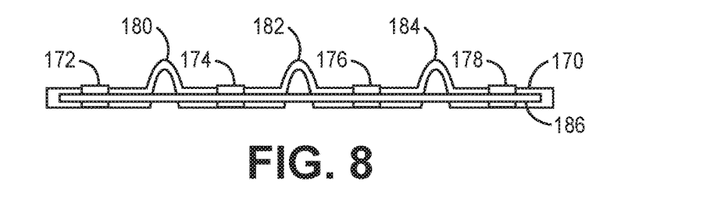
FIG. 8 is a top schematic view of a semiconductor optical waveguide coupled to an RF waveguide in which a first type of compensation sections have altered semiconductor doping levels and a second type of compensation sections have extended portions of optical waveguides extending away from the RF waveguides.
Figure 9:
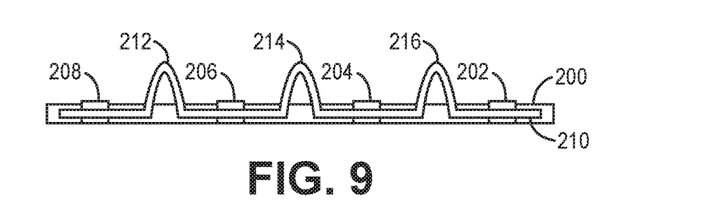
FIG. 9 is a top schematic view of a semiconductor optical waveguide coupled to an RF waveguide in which a first type of compensation sections have altered semiconductor doping levels and a second type of compensation sections have extended portions of RF waveguides extending away from the optical waveguides.

As the second approach for phase correction uses the compensation sections with extra length of RF waveguide or optical waveguide that do not have overlapping RF waveguide and optical waveguide, there is significantly reduced or no electro-optical conversions in the compensation sections. In addition, optical loss or RF loss in these compensation sections can introduce extra optical or RF loss after each compensation section, which also can reduce overall electro-optical conversions. Different from the second approach, the first approach with the compensation sections having lower doping or higher doping allows RF and optical waveguide to be overlapped in the compensation sections, the overall electro-optical conversion efficiency can be improved. However, the change in RF velocity due to the change in the doping is limited. A third approach can provide for high efficiency overall electro-optical conversions by combining the first approach and the second approach. Through appropriate design of the combined compensation sections in the phase shifter, an increased electro-optical conversion efficiency can be achieved for high speed linear MZM modulators. Referring to FIG. 8, optical waveguide 170 has dopant-based compensation sections 172, 174, 176, 178, where the dopant levels are reduced (up to no dopant) or increased relative to the remaining sections of optical waveguide, and extra length based compensation sections 180, 182, 184. RF waveguide 186 is configured to provide electro-optical coupling with optical waveguide 170 except for reduced or eliminated electro-optical coupling along extra length based compensation sections 180, 182, 184. Referring to FIG. 9, optical waveguide 200 has dopant-based compensation sections 202, 204, 206, 208, and RF waveguide 210 has extra length-based compensation sections 212, 214, 216. RF waveguide 210 is configured to provide electro-optical coupling with optical waveguide 200 except for reduced or eliminated coupling at extra length-based compensation sections 212, 214, 216.

As shown in FIGS. 8 and 9, the compensation sections based on dopant concentration changes generally are at different physical locations than compensation sections based on extended waveguide lengths. As noted above, the number of each type of compensation sections can be selected within reasonable ranges. While there is some symmetry with the alternating style of FIGS. 8 and 9, there is no need for such a design, so any reasonable order and positioning along the length of the waveguides can be used for the different types of compensation sections. The dopant levels and lengths for waveguide extensions are described above in the context of FIGS. 4-7, and these parameters are equally applicable as if written here for the embodiments of FIGS. 8 and 9, which involve a combination of these features.

While FIGS. 4-9 provide informative depictions of various embodiments of the improved structures herein, more specific details are provided below for some specific embodiments of the various waveguides. With respect to evaluation of the phase shifts, the accumulated phase difference between RF and optical waveguide can be expressed by following equation:

$$\varphi = \int \frac{2\pi f_m}{v_{rf}(l_{rf})} dl_{rf} - \int \frac{2\pi f_m}{v_{opt}(l_{opt})} dl_{opt} \qquad (1)$$

Where, $\varphi$ is accumulated phase difference between RF and optical waveguides, $f_m$ is modulation frequency, $v_{rf}$ is travel wave velocity of RF waveguide, $v_{opt}$ is travel wave velocity of optical waveguide, $l_{rf}$ and $l_{opt}$ are RF and optical waveguide lengths, respectively. In some embodiments, the design goal is to keep the accumulated phase ($\varphi$) within desired boundary values along the RF and optical travel waveguides by periodic compensation to achieve high efficiency for high speed linear modulations. The decrease in accumulated phase difference generated by the embodiments in FIGS. 4-9 can be understood in terms of the changes introduced in equation (1).

In general, the waveguides comprise multiple compensation sections in alternating configurations with other sections that provide the electro-optic coupling. In some embodiments, the alternating compensation sections can be periodic, i.e., alternating is approximately equally spaced increments along the length of the waveguide. With respect to periodic compensation sections, the periodic compensations in the segmented structures may potentially generate the distributed reflections along RF or optical waveguides between segments, depending on design requirements, which may form the resonant structures. To avoid the impact of such resonant structures for applications, the segment length period is required to be smaller to move resonant frequencies above operating frequency range as the following formulae:

$$fop < fr = c/(2*n*Lseg) \qquad (2)$$

Where fop is operating frequency of MZM applications, fr is resonant frequency due to distributed reflection from segmented structures, c is optical velocity, n is effective index for optical or RF waveguide which is defined as the ratio of optical speed (c) to optical or RF wave velocity, and Lseg is the period of segment length.

Figure 10:
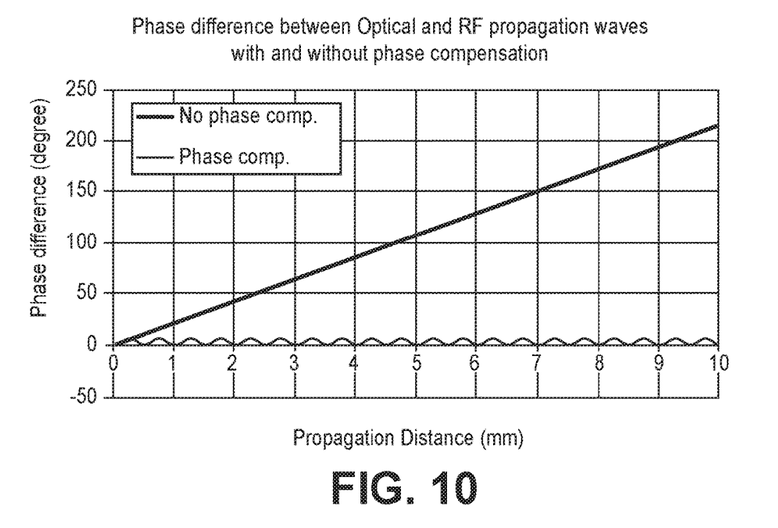
FIG. 10 is a plot of phase differences for a particular model described below.
Figure 11:
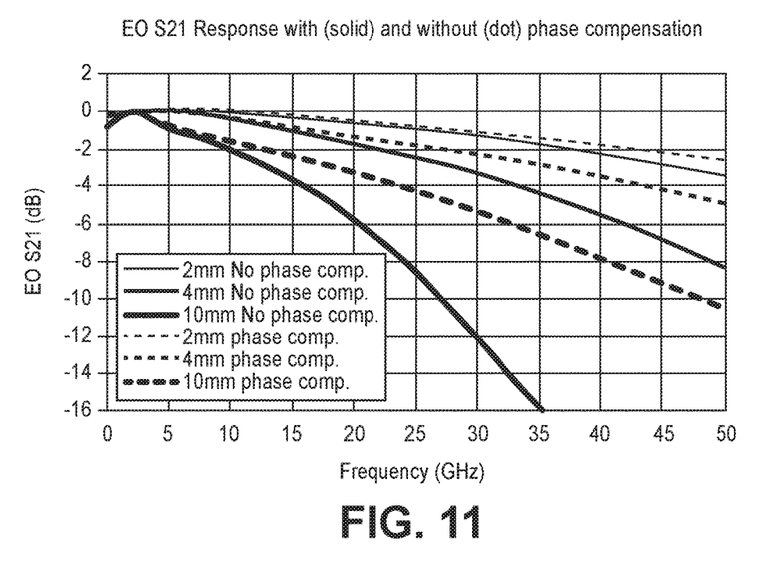
FIG. 11 is a plot of electro-optical S21 transmission properties as a function of frequency for three model systems with phase compensation and three corresponding model systems without phase compensation.

For an effective index of refraction of 3.9 for a silicon-based optical waveguide, the length of the period can be equal to less than 500 microns to have the resonance above 75 GHz which is sufficient for 64 GB/s applications, or equal to less than 250 microns to have the resonance above 150 GHz for 120 GB/s applications. In an example design of a MZM, effective optical index for optical waveguide is 3.9 while the effective RF index for doped RF waveguide is 3.3. This refractive index mismatch can cause a phase mismatch and low band width. In this design example, 3 dB electro-optical band width (EO BW) can be improved from 28 GHz to 36 G for 10 mm long phase shifter and from 13 GHz to 18 GHz for 4 mm long phase shifter with the segmented phase compensation as described in this disclosure. The period of the compensation segment length of 500 microns is used for the estimates. For this model, the phase difference with and without compensation is shown in FIG. 10. FIG. 11 shows the electro-optical S21 transmission response for three modulator lengths with and without compensation as a function of transmission frequency. For a particular error tolerance, the compensated signals provides desirable bandwidths to higher frequencies. The compensation can be either adding high doping sections or adding extra RF waveguides or combination of both to slow down RF propagation for phase match optical and RF wave propagation as proposed in this disclosure.

While the compensation segments may or may not be periodic, the distance scales above provide useful reference points. In general, the lengths of the optical waveguide and coupled RF waveguides can be from about 1 mm to about 30 mm and in further embodiments from about 2 mm to 25 mm, with a portion of the length interrupted by the compensation segments. In some embodiments, the compensation segments can have lengths from about 5 microns to about 100 microns and in further embodiments from about 7.5 microns to about 75 microns. In some embodiments, the edge to edge spacing between adjacent compensation sections can be from about 35 microns to about 2000 microns and in further embodiments from about 50 microns to about 1500 microns, and for non-periodic embodiments, these values can be considered averages. A person of ordinary skill in the art will recognize that additional ranges within or of similar order to these explicit ranges are contemplated and are within the present disclosure.

While the discussion herein focuses on silicon-based optical waveguides, the principles are generally applicable to other modulator structures with semiconductor optical waveguides, such as indium phosphate (InP) or lithium niobate (LiNbO$_3$) waveguides. However, for silicon-based modulators, the difficulty in identifying alternative solutions to the phase delay issue underscores the significance of the present structures for silicon-based modulators. Iridium phosphide modulator structures are described, for example, in copending U.S. patent application Ser. No. 15/462,099 to Chen et al., "High Frequency Optical Modulator With Laterally Displaced Conduction Plane Relative to Modulating Electrodes," incorporated herein by reference. Lithium niobate based modulators are described for example in published U.S. patent application 2017/0052424 to Iwatsuka et al., entitled "Optical Waveguide Element and Optical Modulator Using the Same," incorporated herein by reference.

The structures with phase-matched optical and RF wave propagation can be applied to different MZM structures. Representative examples are presented below of traveling wave MZM structures with two RF waveguides for two p-n waveguides, and of traveling wave MZM structures with single RF waveguide for dual p-n waveguides. The structures with phase-matched optical and RF wave propagation can be combined with other waveguide sections in proper way for the compensation of imbalance of such as loss and modulation efficiency based on design considerations known in the art.

Figure 12:
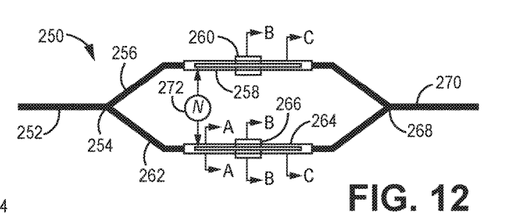
FIG. 12 is a top view of a traveling wave Mach-Zehnder modulator with a representative compensation section on each interferometer arm to provide a context for some representative specific waveguide structures in subsequent figures.

A traveling wave Mach-Zehnder modulator (TW-MZM) structure 250 is shown in FIG. 12. TW-MZM structure 250 comprises input optical waveguide 252, splitter 254, first optical waveguide arm 256, first RF waveguide component 258, first compensation section 260, second optical waveguide arm 262, second RF waveguide component 264, second compensation section 266, optical combiner 268, output optical waveguide 270 and RF driver 272. Various optical splitters/combiners are known in the art, and simple division/combining of the waveguide can be acceptable if the optical loss is within design parameters. Reduced loss designs are described, for example, in copending U.S. patent application Ser. No. 15/490,420 to Ticknor et al., entitled "Planar Lightwave Circuit Splitter/Mixer," incorporated herein by reference. For single MZM TW with dual p-n waveguides, the long waveguide can increase the imbalance of insertion loss and modulation efficiency due to p-n doping misalignment which causes one p-n with overlap and the other p-n with gap although the phase-match can be achieved. The structure with phase-matched sections proposed in this disclosure allow combining the sections for the compensation of imbalance of loss and modulation efficiency between two arms of MZM due to the p-n doping misalignment to achieve high extinction ratio.

Figure 13:
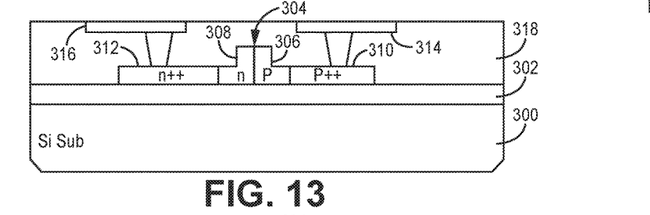
FIG. 13 is a sectional view taken along line A-A of FIG. 12 depicting a silicon-on-insulator (SOI) based optical waveguide with an n-p junction along a rib providing for optical propagation along the rib with highly doped semiconductor wings providing for an interface with RF waveguides.
Figure 19:
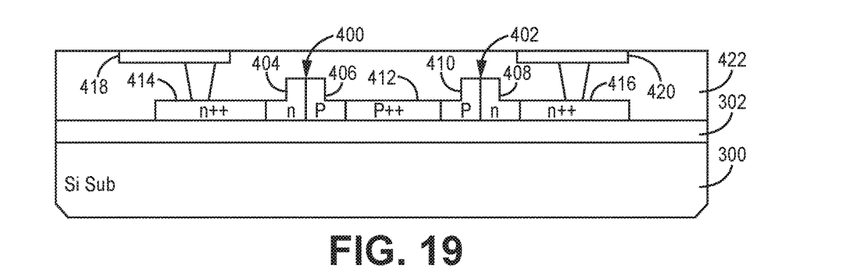
FIG. 19 is a sectional view of a configuration of a traveling wave MZM with dual p-n optical waveguides in which an RF waveguide interfaces with the pair of optical waveguides to perform the electro-optical coupling to modulate the optical signal in which semiconductor doping is configured to provide an interface of the RF waveguides with n++ doped wings extending from the ridge optical waveguides.
Figure 20:
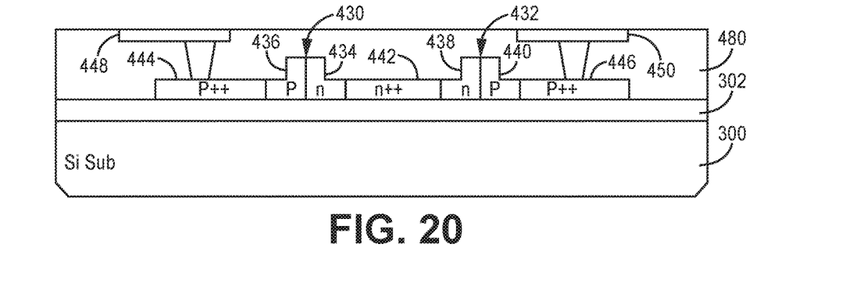
FIG. 20 is a sectional view of a configuration of a traveling wave MZM with dual p-n optical waveguides in which an RF waveguide interfaces with the pair of optical waveguides to perform the electro-optical coupling to modulate the optical signal in which semiconductor doping is configured to provide an interface of the RF waveguides with p++ doped wings extending from the ridge optical waveguides.

RF drivers are discussed further above. RF driver 272 can be connected appropriately to RF waveguide components 258, 264 depending on the configuration of the RF electrodes. FIG. 13 depicts a structure with an RF electrode pair positioned around a single optical waveguide, and another comparable RF electrode pair driven with the same or different RF generator would be positioned around the optical waveguide on the other corresponding optical waveguide arm. FIGS. 19 and 20 depict an RF electrode pair positioned around a pair of optical waveguides. These embodiments are described further below.

FIG. 12 shows only a single compensation section for convenience since the purpose is to provide a context for description of some more specific representative embodiments of the compensation sections. As noted above, an MZM structure can have different numbers of compensation sections along the traveling wave coupled waveguides to achieve desired phase matching, and the additional compensation sections generally can have analogous structures as each other. The following figures depict representative embodiments of traveling wave structures and compensation sections.

A sectional view of a traveling wave RF waveguide with a single p-n junction optical waveguide is shown in FIG. 13 taken along line A-A of FIG. 12. The silicon-on-insulator (SOI) overall structure can have a silicon substrate 300 supporting the structure. Insulation layer 302 can be placed over a smooth surface of silicon substrate 300. Insulation layer 302 can comprise a non-electrically conducting ceramic, such as $SiO_2$ (silica) or sapphire (alumina) $Al_2O_3$ or other appropriate material. The optical waveguide is then formed on insulating layer 302. The optical waveguide in FIG. 13 is optical waveguide ridge 304 with a p-n junction running along the ridge with a vertical interface in the orientation of the figure, comprising p-doped domain 306 and n-doped domain 308. In the embodiment of FIG. 13, higher doped wings extend from the edges of the ridge with a p++ domain 310 extending from p-doped domain 306 and n++ domain 312 extending from n-doped domain 308. RF waveguide electrodes 314, 316 interface, respectively, with p++ domain 310 and n++ domain 312. A polymer, silica or other cladding material 318 can be used to cover exposed portions of the optical waveguide, although air may suffice as a cladding. The formation of doped silicon optical waveguide components can be formed using chemical vapor deposition and photolithography. The RF waveguides can be formed from metal or other electrical conductive material. Metal can be deposited, for example, using physical vapor deposition, such as sputtering, or other suitable method, and metal can be patterned also using photolithography or laser ablation etching.

Figure 14:
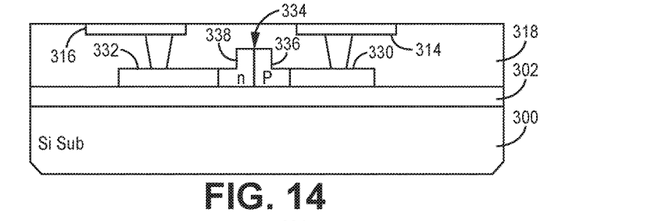
FIG. 14 is a sectional view taken along line B-B of FIG. 12 depicting a first type of compensation section with an altered semiconductor doping level.

FIGS. 14-18 depict cross sections of compensation section 266 taken along line B-B of FIG. 12 for three different embodiments. Referring to FIG. 14, components of the optical waveguides have modified dopant levels. Thus, wing waveguide components 330 and 332 have different dopant levels relative, respectively, to p++ domain 310 and n++ domain 312 of FIG. 13. Corresponding waveguide ridge 334 components 336, 338 may or may not have different dopant levels relative to corresponding ridge waveguide components p-doped domain 306 and n-doped domain 308 of FIG. 13. As described above, the change in dopant levels can be a decrease (optionally down to 0) or an increase.

Figure 15:
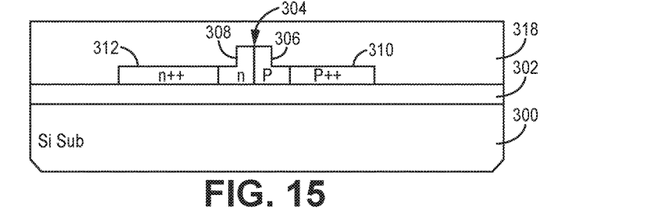
FIG. 15 is a sectional view taken along line B-B of FIG. 12 depicting a second type of compensation section in which the RF waveguide extends away from the continuing optical waveguide.
Figure 16:
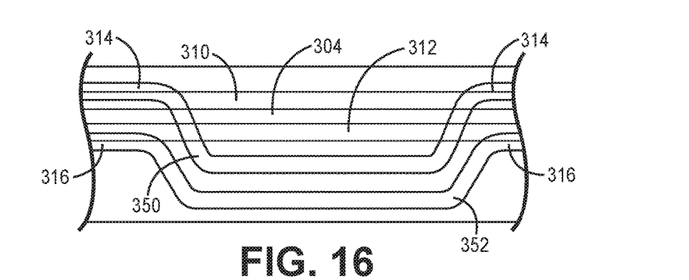
FIG. 16 is a fragmentary top view of the compensation section of FIG. 15 showing the RF waveguides extending away from optical waveguides.

Referring to FIGS. 15 and 16, in this embodiment, compensation section 266 (FIG. 12) has RF waveguide extensions. FIG. 15 has a sectional view along line B-B of FIG. 12 in which the RF waveguide is turned out of the view, and FIG. 16 has a fragmentary top view depicting the extension of the RF waveguide through curvature of the RF waveguide away from the optical waveguides. The optical waveguide components shown in FIG. 15 are essentially as shown in FIG. 13 except for the absence of the RF waveguide components. Referring to FIG. 16, RF waveguide electrode 314 overlapping with the corresponding optical waveguides connect with RF waveguide extension 350 with a waveguide path that is curved away from the optical waveguide with optical waveguide ridge 304, (waveguide wing) p++ domain 310, and (waveguide wing) n++ domain 312. Similarly, RF waveguide electrode 316 overlapping with corresponding optical waveguides connect with RF extension 352 with a waveguide path that is curved away from the optical waveguide. For RF extensions 350, 352, there is considerable design flexibility in the shape of the components with suitable patterning available generally, and the lengths can be selected to achieve desired phase matching as described above, which the schematic view in FIG. 16 is selected to give the idea of the structure without suggesting any particular shape or length. The lengths of the F extensions may or may not be the same.

Figure 17:
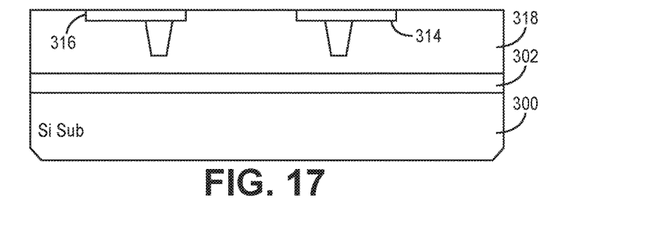
FIG. 17 is a sectional view taken along line B-B of FIG. 12 depicting a third type of compensation section in which the optical waveguide extends away from the continuing RF waveguide.
Figure 18:
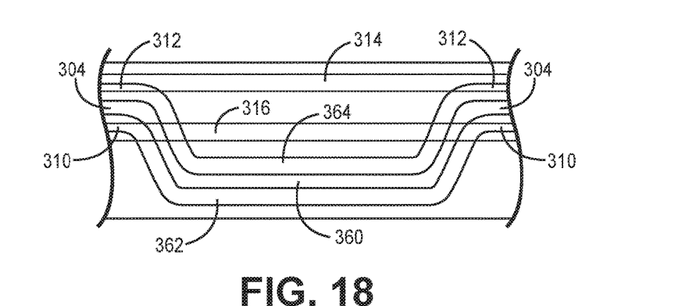
FIG. 18 is a fragmentary top view of the compensation section of FIG. 16 showing the optical waveguides extending away from RF waveguides.

Referring to FIGS. 17 and 18, in this embodiment, compensation section 266 (FIG. 12) has optical waveguide extensions. FIG. 17 has a sectional view along line B-B of FIG. 12 in which the optical waveguide is turned out of the view, and FIG. 18 has a fragmentary top view depicting the extension of the optical waveguide through curvature of the optical waveguide away from the RF waveguides. The RF waveguide components shown in FIG. 17 are essentially as shown in FIG. 13 except for the absence of the optical waveguide components. Referring to FIG. 18, optical waveguide ridge 304 component of the optical waveguide connects with ridge waveguide extension 360, p++ domain 310 component of the optical waveguide connects with p++ waveguide extension 362, and n++ domain 312 of the optical waveguide connects with n++ waveguide extension 364. The design of optical waveguide extensions can provide proper attention to potential optical loss resulting from waveguide curves, although the relatively high index of refraction of silicon allows for more curvature with acceptable loss than many other optical materials. Also, the length of the optical waveguide extensions can be selected to achieve a desired phase matching, and the depiction of the waveguide extension in FIG. 18 is directed to indicating the general idea of the optical waveguide extension and is not intended to depict any particular relative length of the optical waveguide extension. Other p-n diode structures can be effectively used to form the optical waveguide, such as a silicon-based p-n junction optical waveguides with both horizontal and vertical p-n interfaces suitable for phase correction as described herein are described in U.S. Pat. No. 9,541,775 to Ayazi et al., entitled "Method and System for a Low-Voltage Integrated Silicon High-Speed Modulator," and a horizontal p-n junction as described in U.S. Pat. No. 8,320,720 to Webster et al., entitled "Advanced Modulation Formats for Silicon-Based Optical Modulators," both of which are incorporated herein by reference.

FIGS. 19 and 20 show embodiments of a single traveling wave RF electrodes interfaced with a pair of p-n optical waveguides. These traveling wave electro-optical coupling structures can be considered in the context of FIG. 12, and analogous compensation sections corresponding to FIGS. 14-18 (dopant adjustment (FIG. 14), extended RF waveguides (FIGS. 15, 16) and extended optical waveguides (FIGS. 17, 18)) can be used to phase correct the propagating signals through the RF waveguides and the optical waveguides of FIGS. 19 and 20, as well as for the structures in FIGS. 19-22 discussed in detail below.

Referring to FIG. 19, patterned doped silicon over insulating layer 302 on silicon substrate 300 forms two p-n interfaced ridge optical waveguides 400, 402 respectively comprise n-doped region 404, p-doped region 406, n-doped region 408 and p-doped region 410. A p++ region 412 connects p-doped region 406 and p-doped region 410 along the center of the doped silicon structure. A n++ wing 414 extends from n-doped region 404, and n++ wing 416 extends from n-doped region 408. RF waveguide components 418, 420 interface respectively with n++ wing 414 and n++ wing 416. Cladding 422 covers exposed portions of the doped silicon.

Referring to FIG. 20, patterned doped silicon over insulating layer 302 on silicon substrate 300 forms two p-n interfaced ridge optical waveguides 430, 432 respectively with reversed dopant configurations relative to the embodiment in FIG. 19. Ridge optical waveguide 430 comprises n-doped region 434 and p-doped region 436, and ridge optical waveguide 432 comprises n-doped region 438 and p-doped region 440. A n++ region 442 connects n-doped region 434 and n-doped region 438 along the center of the doped silicon structure. A p++ wing 444 extends from p-doped region 436, and p++ wing 446 extends from p-doped region 440. RF waveguide components 448, 450 interface respectively with p++ wing 444 and p++ wing 446. Cladding 460 covers exposed portions of the doped silicon.

Figure 21:
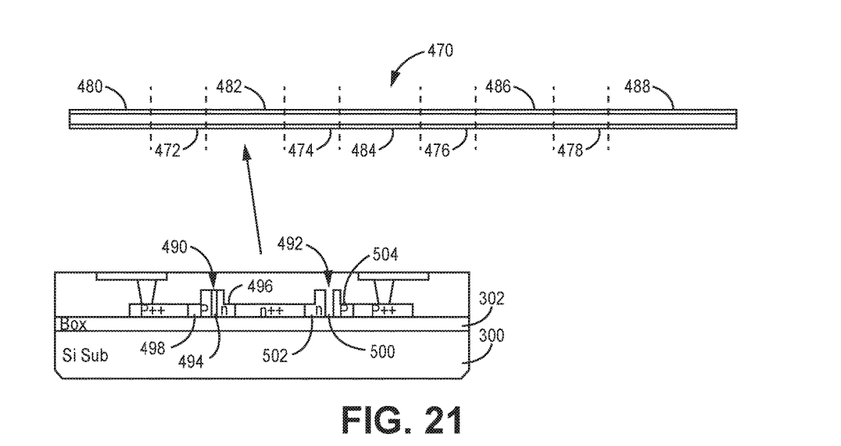
FIG. 21 has an upper image that is a top view of a traveling wave modulator with compensation sections to provide improved phase matching and a lower image that is a sectional view depicting a traveling wave MZM structure with dual p-n optical waveguides interfacing with RF waveguides.

An embodiment of the traveling wave modulator of FIG. 20 with compensation sections having modified dopant levels is shown in FIG. 21. A top view in the upper portion of FIG. 21 shows traveling wave modulator 470 with 4 compensation sections 472, 474, 476, 478 dividing segments 480, 482, 484, 486, 488 with baseline doping levels to achieve desired electro-optical coupling. The sectional view in the lower view of FIG. 21 shows the doping structure in one of the baseline sections of traveling wave modulator 470. As shown in the lower view of FIG. 21, optical waveguide ridges 490, 492 has dopant p-n misalignment shown in exaggerated form for view with waveguide ridge 490 having an overlap region 494 between n-doped region 496 and p-doped region 498 and with waveguide ridge 492 having a dopant gap 500 between n-doped region 502 and p-doped region 504.

Figure 22:
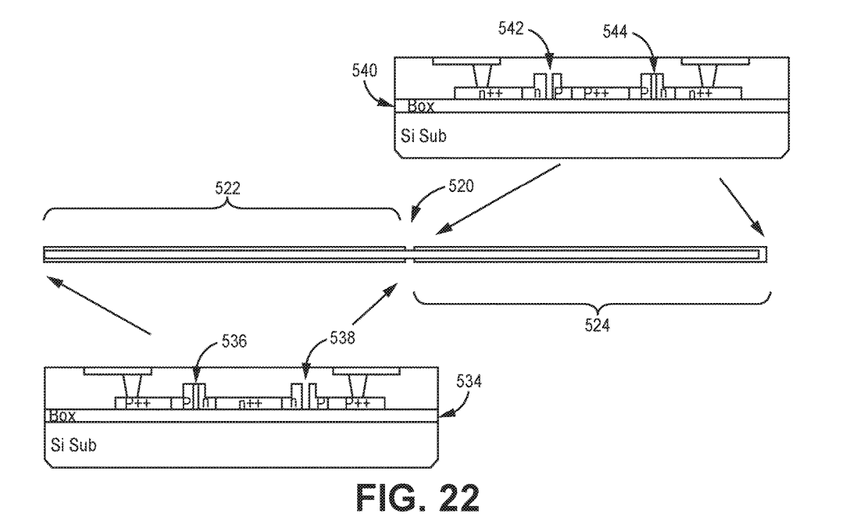
FIG. 22 has a central image that is a top view of a traveling wave modulator with two distinct segments having reversed dopant symmetry, a lower image that is a sectional view depicting a traveling wave MZM structure with dual p-n optical waveguides with a first dopant symmetry interfacing with RF waveguides, and an upper image that is a sectional view depicting a traveling wave MZM structure with dual p-n optical waveguides with a second dopant symmetry reversed from the first dopant symmetry interfacing with the RF waveguides.

To compensate for some of the imbalance of insertion loss and modulator efficiency due to p-n doping misalignment, whether or not phase matching is achieved, the alternative dopant structures of FIGS. 19 and 20 can be used for portions of the traveling wave modulator. Referring to a top view in the central image of FIG. 22, traveling wave modulator 520 comprises a first section 522 with the dopant structure of FIG. 19 and a second section 524 with the dopant structure of FIG. 20 along with any imperfections due to doping misalignment. The sectional view in the lower image of FIG. 22 depicts traveling wave modulator 534 with a dopant structure to provide desired electro-optical coupling having a dopant structure similar to FIG. 20 but with effects shown for dopant misalignment in optical waveguide ridge 536 and optical waveguide ridge 538. The sectional view in the upper image of FIG. 22 depicts traveling wave modulator 540 with a dopant structure to provide desired electro-optical coupling having a dopant structure similar to FIG. 19 but with effects shown for dopant misalignment in optical waveguide ridge 542 and optical waveguide ridge 544. The use of waveguide structures with the reversed dopant structures can compensate for some of the imbalance resulting from the dopant misalignment.

The structure in FIG. 22 further allows for the reversal of the phase modulation to allow for continued accumulation of optical signal modulation from the electro-optical coupling. Thus, if the phase difference accumulates to be greater than ±90 degrees, the shift of the phase modulation due to the dopant change allows for continued accumulation of the electro-optical phase modulation. If the phase walk-off reached ±270 degrees, a switch of the dopant type again provides for continued accumulation of electro-optical phase shift of the signal. The process of dopant switching can be continued for additional walk-off shifts of ±180 degrees. Periodic poling has been used for lithium niobate based modulators.

Figure 23:
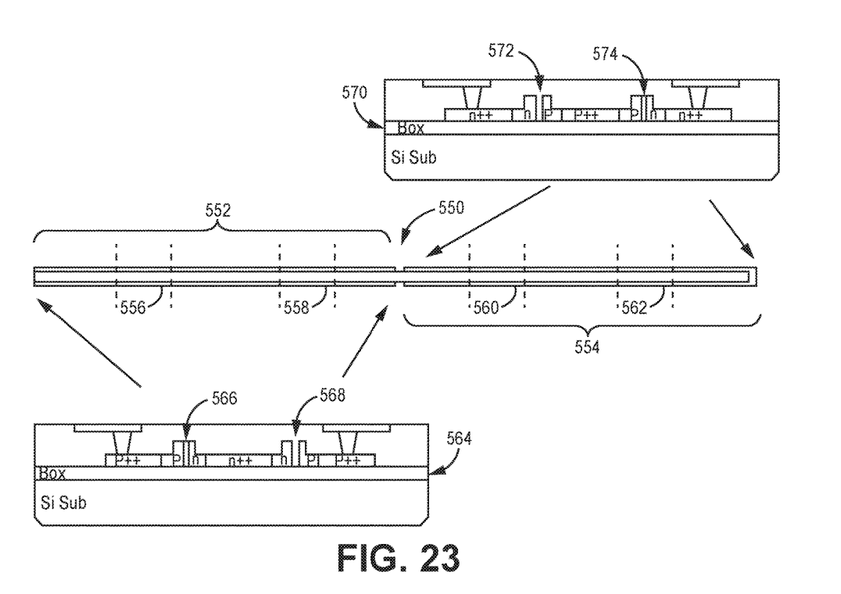
FIG. 23 has a central image that is a top view of a traveling wave modulator with two distinct segments having reversed dopant symmetry similar to FIG. 22 but with compensation sections with modified dopant levels similar to FIG. 20 to provide for improved phase matching, a lower image that is a sectional view depicting a traveling wave MZM structure with dual p-n optical waveguides with a first dopant symmetry interfacing with RF waveguides, and an upper image that is a sectional view depicting a traveling wave MZM structure with dual p-n optical waveguides with a second dopant symmetry reversed from the first dopant symmetry interfacing with the RF waveguides.

Referring to FIG. 23, compensation for dopant misalignment as well as for the accumulation of phase walk-off beyond ±90 degrees through the reversal of the dopant structure, as shown in FIG. 22 is combined with dopant modification for compensation of phase misalignment as shown in FIG. 21. Referring to a top view of the central image in FIG. 23, traveling wave modulator 550 comprises a first section 552 with the dopant structure of FIG. 19 and a second section 554 with the dopant structure of FIG. 20 along with any imperfections due to doping misalignment. First section 552 comprises compensation sections 556, 558 with altered dopant levels for phase matching, and second section 554 comprises compensation sections 560, 562 with altered dopant levels for phase matching. The sectional view in the lower image of FIG. 23 depicts traveling wave modulator 564 with a dopant structure to provide desired electro-optical coupling having a dopant structure similar to FIG. 20 but with effects shown for dopant misalignment in optical waveguide ridge 566 and optical waveguide ridge 568. The sectional view in the upper image of FIG. 23 depicts traveling wave modulator 570 with a dopant structure to provide desired electro-optical coupling having a dopant structure similar to FIG. 19 but with effects shown for dopant misalignment in optical waveguide ridge 572 and optical waveguide ridge 574. In the embodiment of FIG. 23, the use of the dopant structures of first section 552 and second section 554 can provide imbalance compensation for some of the issues resulting from dopant misalignment and the use of compensation sections 556, 558, 560, 562 can provide improved phase matching. While the number of dopant varying compensation sections in FIG. 23 is shown as two per dopant symmetry, as noted above, the number of compensation sections can be selected as desired from 1 to 10 or more.

Figure 24:
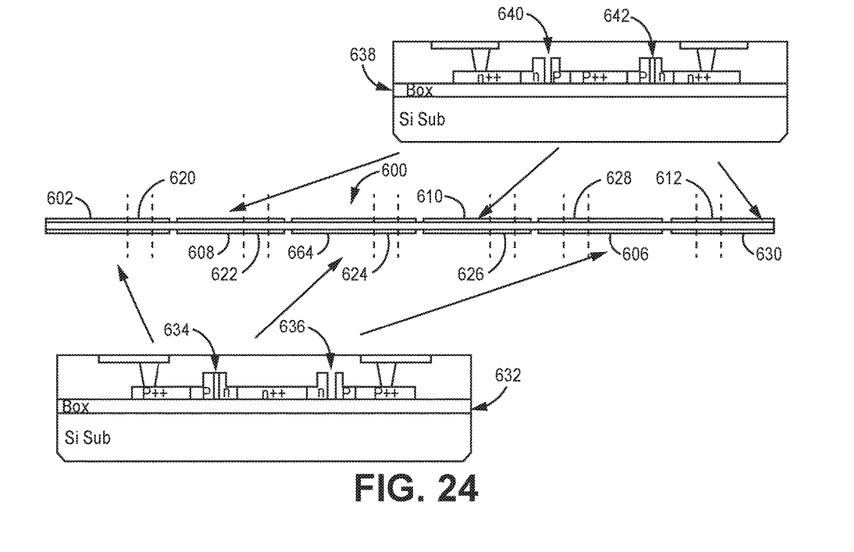
FIG. 24 has a central image that is a top view of a traveling wave modulator with alternating distinct segments having reversed dopant symmetry similar to FIG. 22 in which the segments with a particular dopant symmetry have a compensation section with modified dopant levels similar to FIG. 20 to provide for improved phase matching, a lower image that is a sectional view depicting a traveling wave MZM structure with dual p-n optical waveguides with a first dopant symmetry interfacing with RF waveguides, and an upper image that is a sectional view depicting a traveling wave MZM structure with dual p-n optical waveguides with a second dopant symmetry reversed from the first dopant symmetry interfacing with the RF waveguides.

The organization of first section 552 and second section 554 in FIG. 23 can be generalized to provide for more alternation of the dopant symmetries. Referring to a top view of the central image in FIG. 24, traveling wave modulator 600 comprises segments 602, 604, 606 with a first dopant symmetry and segments 608, 610, 612 with a reversed dopant symmetry. Segments 602, 604, 606 respectively comprise compensation sections 620, 622, 624 with altered dopant levels for improved phase matching, and segments 608, 610, 612 respectively comprise compensation sections 626, 628, 630 with altered dopant levels for improved phase matching. While FIG. 24 top view depicts one compensation section per segment, a greater number can be used independently for each segment as described generally above. The sectional view in the lower image of FIG. 24 depicts traveling wave modulator 632 with a dopant structure to provide desired electro-optical coupling having a dopant structure similar to FIG. 20 but with effects shown for dopant misalignment in optical waveguide ridge 634 and optical waveguide ridge 636. The sectional view in the upper image of FIG. 24 depicts traveling wave modulator 638 with a dopant structure to provide desired electro-optical coupling having a dopant structure similar to FIG. 19 but with effects shown for dopant misalignment in optical waveguide ridge 640 and optical waveguide ridge 642. Based on the disclosure herein, the specific embodiment suggests alternative embodiments using different numbers of alternating dopant symmetries distinct from the three segments of each type of dopant symmetry shown in FIG. 24. In the embodiment of FIG. 24, the use of the dopant structures of first dopant symmetry of segments 602, 604, 606 and second dopant symmetry of segments 608, 610, 612 can provide imbalance compensation for some of the issues resulting from dopant misalignment, and the use of compensation sections 620, 622, 624, 626, 628, 630 can provide improved phase matching.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated.

What is claimed is:

1. An optical modulator comprising a semiconductor-based optical waveguide and a pair of RF waveguides, wherein the optical waveguide and the RF waveguide are configured with coupling regions to provide an RF electromagnetic field within the optical waveguide and with one or more compensation sections with lengths of optical waveguide and/or RF waveguide that have substantially reduced or eliminated electro-optical coupling, wherein the RF waveguides form a continuous waveguide structure through the one or more compensation sections, wherein the compensation section has an extended portion of optical waveguide not interfacing with the RF waveguide or an extended portion of RF waveguide not interfacing with the semiconductor optical waveguide.

2. The optical modulator of claim 1 wherein the one or more compensation sections is three or more compensation sections.

3. The optical modulator of claim 1 wherein the compensation sections comprise a RF waveguide that turns away from the optical waveguide and follows a path that realigns with the optical waveguide at another end of the compensation section to resume electro-optical coupling away from the compensation section.

4. The optical modulator of claim 1 wherein the compensation sections comprise an optical waveguide that turns away from the RF waveguide and follows a path that realigns with the RF waveguide at another end of the compensation section to resume electro-optical coupling away from the compensation section.

5. The optical modulator of claim 1 further comprising dopant compensation section comprising an altered cross sectional dopant profile relative to the semiconductor-based optical waveguide away from the compensation section.

6. The optical modulator of claim 1 wherein the semiconductor-based optical waveguide comprises a silicon-based optical waveguide.

7. The optical modulator of claim 6 wherein the silicon-based optical waveguide comprises a p-n dopant interface within a doped silicon ridge.

8. The optical modulator of claim 7 comprising a Mach-Zehnder modulator structure with an input waveguide, two interferometer arms, an optical splitter optically connecting the input waveguide with the two interferometer arms, wherein one interferometer arm corresponds with the semiconductor-based optical waveguide.

9. The optical modulator of claim 8 wherein two highly doped silicon wings connect to the doped silicon ridge, and wherein RF waveguides interface with each highly doped silicon wing.

10. The optical modulator of claim 8 further comprising an additional semiconductor based optical waveguide corresponding with another interferometer arm and having a p-n dopant interface within a doped silicon ridge, and wherein a highly doped wing extends from each doped silicon ridge extending way from the other ridge, and wherein RF waveguides interface with each highly doped silicon wing.

11. A method for modulating an optical signal comprising:
propagating optical laser light down a semiconductor optical waveguide; and
propagating RF signal along a pair of RF waveguides, wherein the semiconductor optical waveguide and the RF waveguide are configured in a traveling wave modulator structure to provide electro-optical coupling, wherein the traveling wave modulator structure comprise one or more compensation sections at which the relative phase of the propagating optical light and the propagating RF signal are corrected for a propagating speed differential and wherein the optical signal is modulated by a single RF signal, wherein each compensation section independently has altered doping of the semiconductor waveguide interfacing with the RF waveguide, an extended portion of optical waveguide not interfacing with the RF waveguide, or an extended portion of RF waveguide not interfacing with the semiconductor optical waveguide.

12. The method of claim 11 wherein the one or more compensation sections are three or more compensation sections.

13. The method of claim 11 wherein the semiconductor optical waveguide comprises a n-p interface at a ridge of doped semiconductor.

14. The method of claim 11 wherein the semiconductor optical waveguide and the pair of RF waveguides are components of a Mach-Zehnder modulator comprising an input waveguide, an optical splitter, two Mach-Zehnder interferometer (MZI) arms, an optical coupler, an output optical waveguide, a pair of RF waveguides and a RF generator.

15. The method of claim 14 wherein a first RF waveguide of the pair of RF waveguides interfaces with a first MZI arm and a second RF waveguide of the pair of RF waveguides interfaces with a second MZI arm, and wherein interfaces of optical waveguides and RF waveguides generates electro-optical coupling.

16. The method of claim 14 wherein pair of RF waveguides interfaces with a first MZI arm, and further comprising another pair of RF waveguides interfacing with the second MZI arm.

17. The method of claim 11 wherein the semiconductor-based optical waveguide comprises a silicon-based optical waveguide.

* * * * *